(12) United States Patent
Ramanathan et al.

(10) Patent No.: US 9,443,331 B2
(45) Date of Patent: Sep. 13, 2016

(54) INPUT OBJECT FOR ROUTING INPUT FOR VISUAL ELEMENTS

(71) Applicant: Microsoft Technology Licensing, LLC, Redmond, WA (US)

(72) Inventors: Raju Ramanathan, Redmond, WA (US); Pravin Kumar Santiago, Issaquah, WA (US); Thomas Olsen, Sammamish, WA (US); Reiner Fink, Mercer Island, WA (US); Alice M. Tang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 353 days.

(21) Appl. No.: 13/911,729

(22) Filed: Jun. 6, 2013

(65) Prior Publication Data

US 2014/0362122 A1    Dec. 11, 2014

(51) Int. Cl.
*G06T 11/20*    (2006.01)
*G06F 9/44*    (2006.01)

(52) U.S. Cl.
CPC ............. *G06T 11/20* (2013.01); *G06F 9/4443* (2013.01)

(58) Field of Classification Search
None
See application file for complete search history.

(56) References Cited

U.S. PATENT DOCUMENTS

| | | | |
|---|---|---|---|
| 7,185,333 B1* | 2/2007 | Shafron | ..................... 717/173 |
| 7,277,095 B2 | 10/2007 | Beaumont | |
| 7,839,419 B2 | 11/2010 | Hanggie et al. | |
| 8,108,799 B2 | 1/2012 | Brugiolo et al. | |
| 2003/0088410 A1* | 5/2003 | Geidl | ..................... G06K 9/72 704/235 |
| 2003/0210270 A1* | 11/2003 | Clow et al. | ..................... 345/767 |
| 2004/0196293 A1* | 10/2004 | Fernandez et al. | ........... 345/581 |
| 2006/0288303 A1 | 12/2006 | Tachihara et al. | |
| 2007/0101298 A1* | 5/2007 | Yolleck | ............. G06F 17/30861 715/850 |
| 2010/0152899 A1* | 6/2010 | Chang | ..................... B25J 9/162 700/262 |
| 2012/0306912 A1 | 12/2012 | Blanco et al. | |
| 2013/0063445 A1 | 3/2013 | Blanco et al. | |
| 2013/0063482 A1 | 3/2013 | Moncayo et al. | |
| 2013/0187931 A1* | 7/2013 | Zhao | ..................... G06F 8/38 345/501 |

FOREIGN PATENT DOCUMENTS

WO    2011/116182 A1    9/2011

OTHER PUBLICATIONS

"International Search Report & Written Opinion for PCT Patent Application No. PCT/US2013/060774", Mailed Date: Mar. 27, 2014, Filed Date: Sep. 20, 2013, 8 Pages.
"Managing DirectComposition Animation with Windows Animation Manager v2 sample", Retrieved at <<http://code.msdn.microsoft.com/windowsdesktop/Managing-DirectComposition-fb680140>>, Retrieved date: Apr. 10, 2013, pp. 2.
"DirectComposition Effects with Direct2D Bitmap Content Sample", Retrieved at <<http://code.msdn.microsoft.com/windowsdesktop/DCompEffectsD2DSDK-5c91336f>>, Retrieved date: Apr. 11, 2013, pp. 2.
Tonouchi, et al., "Creating Visual Objects by Direct Manipulation", Retrieved at <<http://pdf.aminer.org/000/641/485/creating_visual_objects_by_direct_manipulation.pdf>>, In IEEE International Workshop on Visual Languages, Sep. 15, 1992, pp. 7.

* cited by examiner

*Primary Examiner* — Andrew G Yang
(74) *Attorney, Agent, or Firm* — Timothy Churna; Judy Yee; Micky Minhas

(57) ABSTRACT

Techniques for an input object for routing input for visual elements are described. In at least some embodiments, a region of a display area includes multiple graphic elements that can be generated and/or managed by different graphics functionalities. For instance, a graphical user interface (GUI) for an application can include a primary window and visual elements within the primary window, such as banners, control buttons, menus, fillable fields, and so forth. In at least some embodiments, the primary window of the GUI can be managed by a first graphics functionality, while one or more visual elements within the primary window can be managed by a second graphics functionality. In accordance with one or more embodiments, an input object is employed to route input to visual elements to a graphics functionality responsible for managing the visual elements.

20 Claims, 11 Drawing Sheets

INPUT OBJECT FOR ROUTING INPUT FOR VISUAL ELEMENTS

BACKGROUND

Today's computing devices have access to a variety of visual content. For example, a web browsing application can display different types of content within an associated display area of a device. To enable visual content to be processed and displayed, an array of different graphics functionalities can be employed. Examples of such functionalities include rendering engines, graphics application programming interfaces (APIs), graphics editors, and so on.

While the availability of different graphics functionalities provides for a variety of options for processing and displaying visual content, enabling interaction between graphics functionalities presents challenges. For example, a display region may include visual content managed by different graphics functionalities. If a user provides input to a visual element of the display region, ensuring that the input is routed to the graphics functionality responsible for the visual element can be challenging.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for an input object for routing input for visual elements are described. In at least some embodiments, a region of a display area includes multiple graphic elements that can be generated and/or managed by different graphics functionalities. Examples of graphics functionalities include a rendering engine, a graphics application programming interface (API), a graphics platform, and so forth.

For instance, a graphical user interface (GUI) for an application can include a primary window and visual elements within the primary window, such as banners, control buttons, menus, fillable fields, and so forth. In at least some embodiments, the primary window of the GUI can be managed by a first graphics functionality, while one or more visual elements within the primary window can be managed by a second graphics functionality. In accordance with one or more embodiments, an input object is employed to route input to visual elements to a graphics functionality responsible for managing the visual elements.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for an input object for routing input for visual elements are described. In at least some embodiments, a region of a display area includes multiple graphic elements that can be generated and/or managed by different graphics functionalities. Examples of graphics functionalities include a rendering engine, a graphics application programming interface (API), a graphics platform, and so forth.

For instance, a graphical user interface (GUI) for an application can include a primary window and visual elements within the primary window, such as banners, control buttons, menus, fillable fields, and so forth. In at least some embodiments, the primary window of the GUI can be managed by a first graphics functionality, while one or more visual elements within the primary window can be managed by a second graphics functionality. In accordance with one or more embodiments, an input object is employed to route input to visual elements to a graphics functionality responsible for managing the visual elements.

Generally, an input object is a data structure (e.g., a component object model (COM) object) that is linked to a visual element and configured such that input to the visual element can be appropriately handled. For instance, consider the scenario mentioned above where a primary window of a GUI is managed by a first graphics functionality, and a visual element within the primary window is managed by a second graphics functionality. An input object can be linked to the visual element such that if a user provides input to the visual element, the input is routed to the second graphics functionality. The second graphics functionality can perform various processing using the input, such as causing content to be retrieved, navigating within the GUI and/or to other GUIs, submitting the input to other resources for processing, and so forth. Thus, an input object can be employed to configure a custom input pipeline for various visual elements.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example methods in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
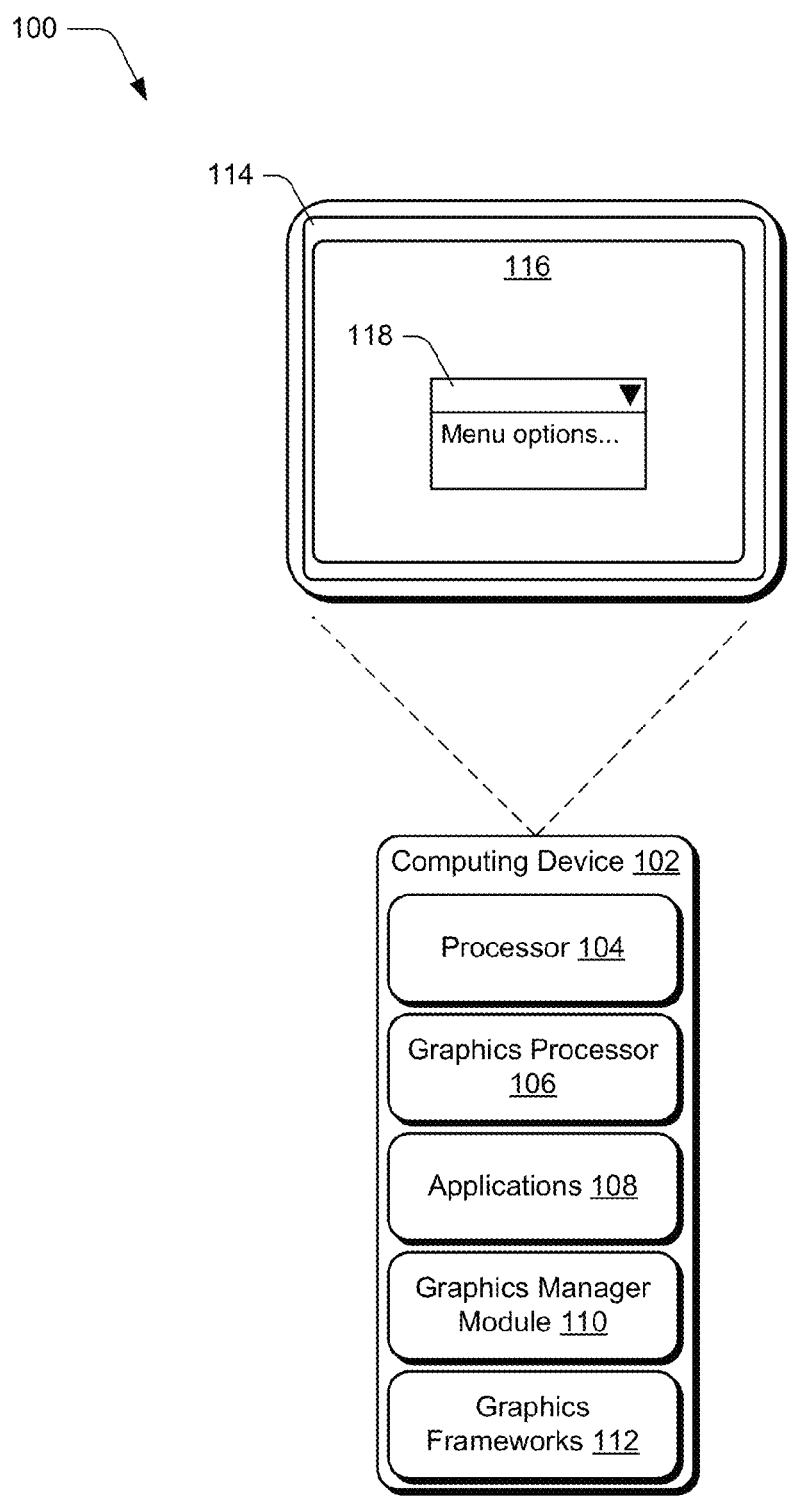
FIG. 1 is an illustration of an environment in an example implementation that is operable to employ techniques discussed herein.

FIG. 1 is an illustration of an environment 100 in an example implementation that is operable to employ techniques for input object for routing input for visual elements described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device (e.g., a tablet), and so forth as further described in relation to FIG. 12.

Computing device 102 includes a processor 104, which is representative of functionality to perform various types of data processing for the computing device 102. For example, the processor 104 can represent a central processing unit (CPU) of the computing device 102. Further examples of implementations of the processor 104 are discussed below with reference to FIG. 12.

Further illustrated is a graphics processor 106, which is representative of functionality to perform various graphics-related tasks for the computing device 102. The graphics processor 106, for example, can represent a graphics processing unit (GPU) of the computing device 102.

The computing device 102 further includes applications 108 and a graphics manager module 110. The applications 108 are representative of functionalities to perform various tasks via the computing device 102. Examples of the applications 108 include a word processor application, an email application, a content editing application, a web browsing application, a gaming application, and so on.

The graphics manager module 110 is representative of functionality to perform various tasks further to techniques for input object for routing input for visual elements discussed herein. The graphics manager module 110, for instance, can be implemented as a component of an operating system for the computing device 102. Embodiments, however, can employ a variety of different configurations and implementations of the graphics manager module 110. Further details concerning implementation of the graphics manager module 110 are discussed below.

The computing device 102 further includes graphics frameworks 112, which are representative of platforms for performing graphics processing for the computing device 102. Examples of the graphics frameworks 112 include a rendering engine, a graphics application programming interface (API), and so forth. The graphics frameworks 112 also include graphics-related languages and functionalities for processing the languages, such as Extensible Application Markup Language (XAML), Extensible Markup Language (XML), HyperText Markup Language (HTML), and so on. Thus, the graphics frameworks 112 generally represent graphics platforms that may be leveraged by various entities (e.g., the applications 108) to enable graphics to be processed and/or displayed.

A display device 114 is also illustrated, which is configured to output graphics for the computing device 102. Displayed on the display device 114 is a window 116, which is representative of a graphic element associated with an entity, such as one of the applications 108. For example, the window 116 can represent a GUI for a particular application.

Further displayed is a sub-window 118, which is representative of a graphics sub-element of the window 116. In this example, the sub-window 118 represents a menu with selectable menu items.

According to various embodiments, the window 116 and the sub-window 118 can be managed by different graphics frameworks of the graphics frameworks 112. As detailed below, techniques for input object for routing input for visual elements discussed herein can enable input to the different windows to be routed to the appropriate framework(s).

Having described an example environment in which the techniques described herein may operate, consider now some example implementation scenarios in accordance with one or more embodiments.

Example Implementation Scenarios

The following discussion describes some example implementation scenarios for techniques for input object for routing input for visual elements described herein. The example implementation scenarios may be implemented in the environment 100 of FIG. 1, the system 1200 of FIG. 12, and/or any other suitable environment.

Figure 2:
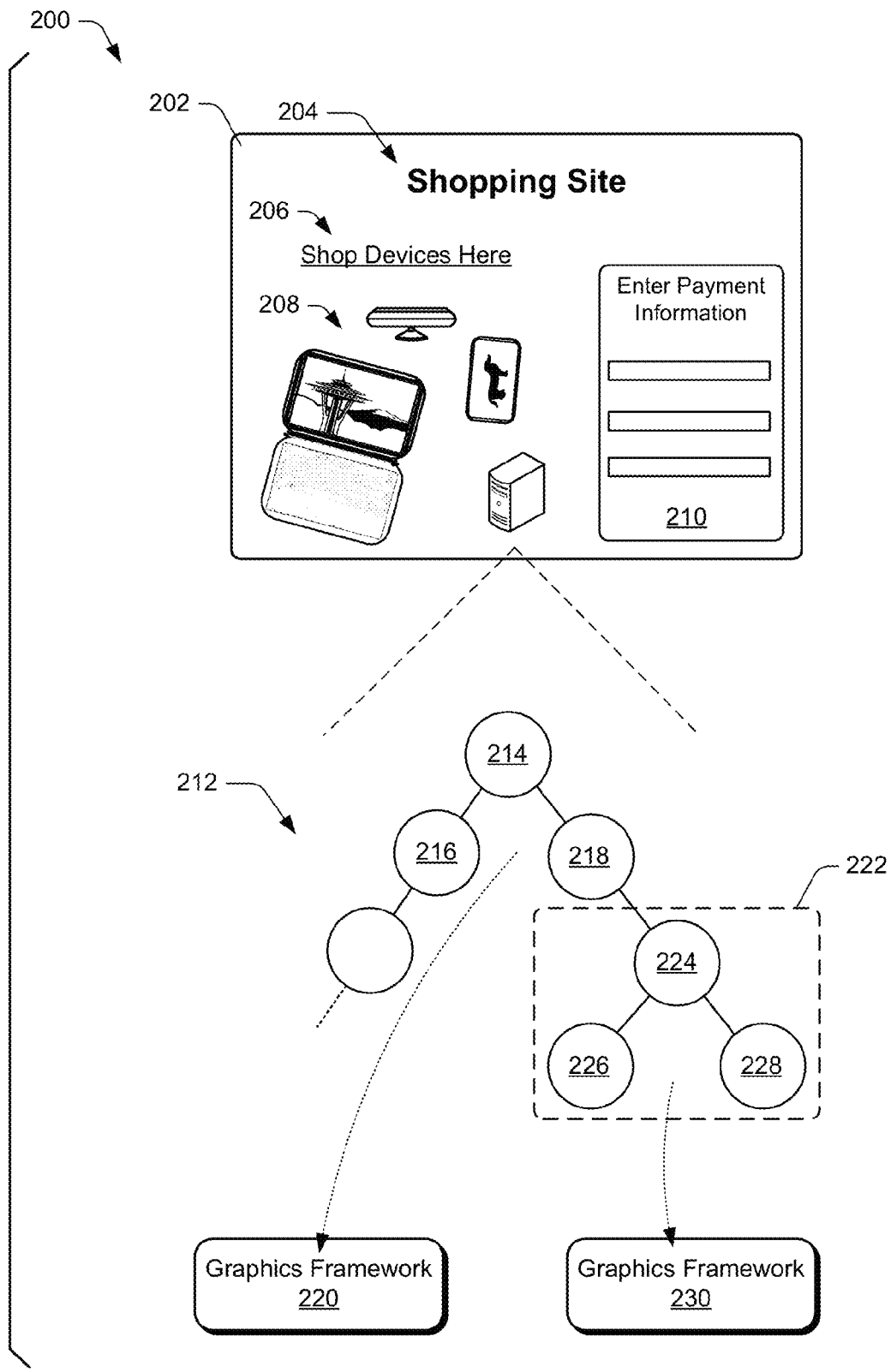
FIG. 2 illustrates an example implementation scenario in accordance with one or more embodiments.

FIG. 2 illustrates an example implementation scenario 200 in accordance with one or more embodiments. The scenario 200 includes a graphical user interface (GUI) 202. The GUI 202, for example, may be displayed on the display device 114 as part of an application, a website, a web-based resource, and so forth. For instance, the GUI 202 can be presented via a web application (e.g., a web browser) of the applications 108. In this particular example, the GUI 202 is presented as part of a shopping website that enables a user to shop online for various goods and/or services.

The GUI 202 includes various visual elements, such as text, images, windows, and so forth. For instance, the GUI 202 includes a banner 204 that identifies a web resource associated with the GUI 202. The GUI 202 further includes a navigation element 206, which is selectable to present different content, such as via navigation to a different GUI. For instance, selecting the navigation element 206 can cause another webpage associated with the shopping website to be presented. The navigation element 206, for example, can represent a selectable hyperlink.

Further illustrated are graphics 208, which represent various graphical elements displayed as part of the GUI 202. Also displayed is a payment window 210, which includes various indicia that can receive payment information from a user. For instance, the payment window 210 includes finable fields in which a user can provide various information, such as a user name, shipping address, account information, credit card information, and so on. The payment window 210, for example, enables a user to provide information further to a purchase of goods and/or services via the GUI 202.

The visual elements included as part of the GUI 202 are presented for purpose of example only, and it is to be appreciated that a variety of different types and instances of visual elements can be implemented in accordance with various embodiments.

The scenario 200 further includes a tree structure 212, which is a data structure that represents various visual elements of the GUI 202. The tree structure 212, for instance, includes different nodes that correspond to respective visual elements of the GUI 202. For example, the nodes can represent graphics objects that correspond to visual elements of the GUI 202.

The tree structure 212 includes a root node 214, which represents the primary window of the GUI 202, e.g., the main window within which other visual elements of the GUI 202 are displayed. The tree structure 212 further includes a child node 216 which represents the navigation element 206, and a child node 218 which represents the graphics 208.

According to various embodiments, the root node 214 and the child nodes 216, 218 are managed by a graphics framework 220. The graphics framework 220, for example, is representative of a particular instance of the graphics frameworks 112 discussed above. In at least some implementations, the graphics framework 220 is responsible for instantiating and managing the GUI 202.

The tree structure 212 further includes a node group 222, which represents the payment window 210. The node group 222, for instance, represents visual and/or functional elements of the payment window 210. The node group 222 includes a child node 224, which represents the payment window 210 as a whole. The node group 222 further includes a child node 226 and a child node 228, which represent sub-elements of the payment window 210. The child nodes 226, 228, for instance, represent different visual elements within the payment window 210, such as different Tillable fields, selectable controls, and so forth.

The configuration and nodes of the tree structure 212 are presented for purpose of example only, and it is to be appreciated that different configurations and arrangements of data structures for representation of visual and/or functional elements can be employed in accordance with various embodiments.

According to one or more embodiments, the node group 222 is managed by a graphics framework 230. The graphics framework 230, for example, is representative of a particular instance of the graphics frameworks 112 discussed above. In at least some implementations, the graphics framework 230 is responsible for instantiating and managing the payment window 210 and its particular sub-elements, such as based on a request from the graphics framework 220. The graphics framework 230, for example, can generate the node group 222 and with permission from the graphics framework 220, append the nodes of the node group 222 to the tree structure 212 to enable the payment window 210 to be displayed as part of the GUI 202.

Thus, the graphics framework 220 and the graphics framework 230 represent different frameworks of the graphics frameworks 112, which can manage (e.g., separately and/or independently) different visual and/or functional elements of the GUI 202.

According to various embodiments, techniques discussed herein enable interactions with (e.g., user input to) various visual elements of the GUI 202 to be routed to the appropriate graphics framework(s). For instance, input to visual elements managed by the graphics framework 220 (e.g., the banner 204, the navigation element 206, the graphics 208, and so forth) can be routed to and handled by the graphics framework 220. With reference to the tree structure 212, for example, input to nodes managed by the graphics framework 220 can be routed to and handled by the graphics framework 220.

Techniques further enable input to visual elements managed by the graphics framework 230 to be appropriately routed. For instance, consider the follow example scenario.

Figure 3:
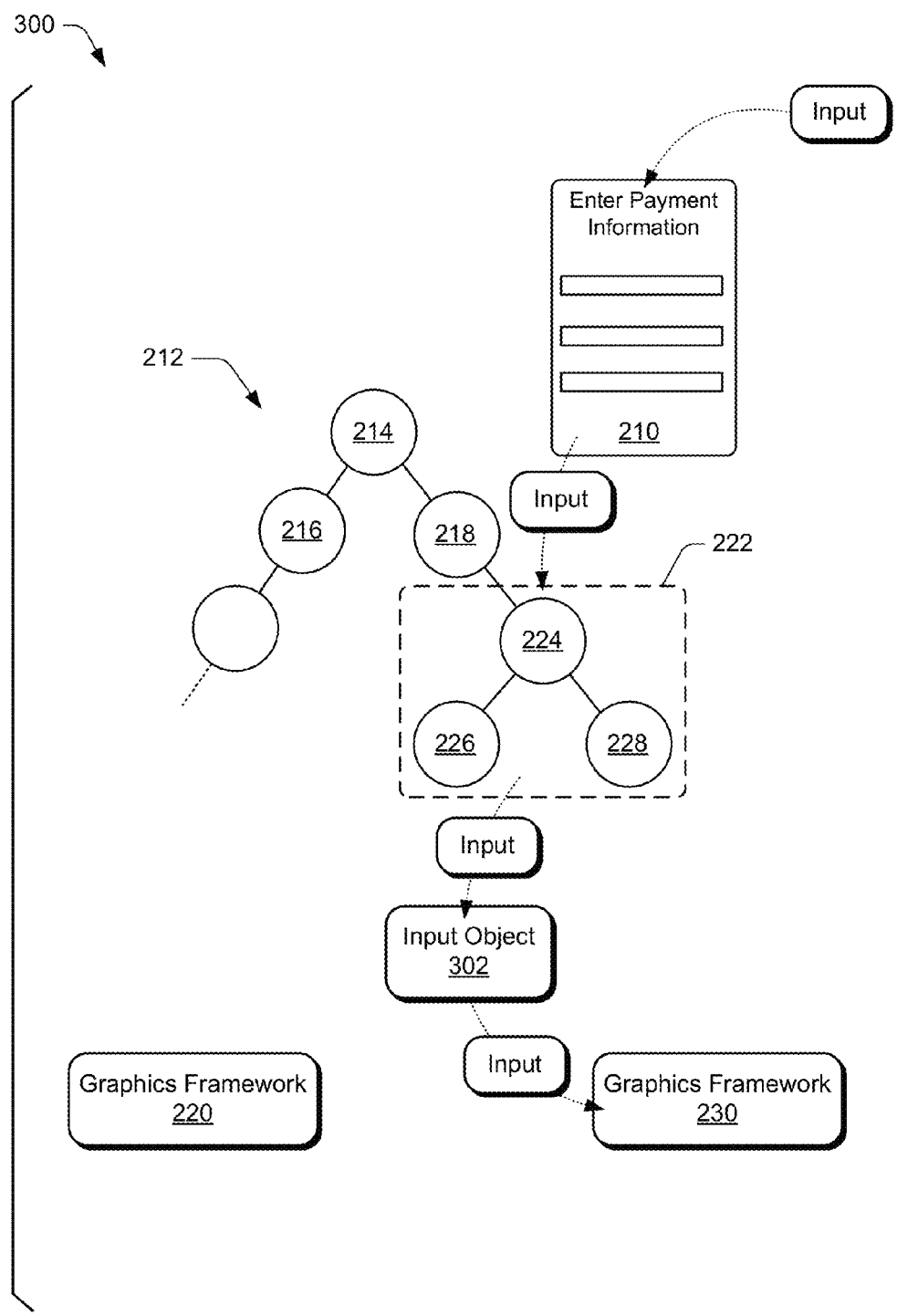
FIG. 3 illustrates an example implementation scenario in accordance with one or more embodiments.

FIG. 3 illustrates an example implementation scenario 300 in accordance with one or more embodiments. The scenario 300 includes the payment window 210 and the tree structure 212, introduced above in the discussion of FIG. 2.

To enable input to the payment window 210 to be routed to the graphics framework 230, the scenario 300 includes an input object 302. Generally, the input object 302 is a data structure that can be linked to various visual elements such that input to the visual elements can be appropriately routed. In at least some embodiments, the input object 302 includes and/or is associated with functionality that detects input to a visual element, and routes the input to an appropriate location. The input object 302 can be generated by and/or managed by various entities, such as the graphics framework 230, the applications 108, the graphics manager module 110, and so forth. Thus, an input object can be used to create a custom input channel such that input to visuals can be routed to various functionalities and/or locations, such as graphics frameworks, applications, services, memory locations, and so on.

With reference to the scenario 300, the input object 302 is linked to the payment window 210 via the node group 222. For instance, the input object 302 is linked to the node 224 such that input to the node 224 is routed to the graphics framework 230. Further, input to the node 226 and/or the node 228 traverses up the tree structure 212 until it reaches the node 224, and thus the input object 302. In at least some embodiments, this enables input to the node group 222 to be routed to the graphics framework 230, while preventing such input from being routed to the graphics framework 220. For example, input to the node group 222 can be routed to the graphics framework 230 without being passed further up the tree structure 212, e.g., to other nodes outside of the node group 222. Further, input to nodes outside of the node group 222 (e.g., the nodes 214, 216, 218) can be routed to the graphics framework 220 without being routed to and/or exposed to the graphics framework 230. Thus, according to various embodiments, input to a particular node traverses up a tree structure until in encounters an input object, at which point the input is routed by the input object.

In one or more embodiments, input to the payment window 210 can be protected such that the input cannot be accessed by the graphics framework 220 and/or other functionalities besides the graphics framework 230. Protecting such input can enhance data security, such as by preventing unauthorized and/or malicious access to data. In some alternative embodiments, however, input to the node group 222 can be routed to multiple graphics frameworks, e.g., both the graphics framework 220 and the graphics framework 230.

According to one or more embodiments, the input object 302 can be linked to the payment window 210 via an identifier for the payment window 210, e.g., an identifier generated by the graphics framework 230 for the payment window 210. Alternatively or additionally, the input object 302 can be linked to the payment window 210 by being associated with a display region (e.g., a pixel region) in which the payment window 210 is displayed. Thus, input to the display region can be detected and routed via the input object 302.

As an example implementation, consider that a user provides input to the payment window 210. For instance, the user can provide various types of payment-related information to fields included in the payment window 210. The input to the associated node(s) of the node group 222 is detected by the input object 302, which routes the input to the graphics framework 230. The graphics framework 230 can process the input accordingly. The graphics framework 230, for example, can be associated with a web-based payment processor, which can perform various processing tasks on the input as part of a purchase of goods and/or services.

While a single input object 302 is illustrated, it is to be appreciated that multiple instances of input objects can be employed in accordance with one or more embodiments. For example, multiple input objects can be individually associated with respective visual elements, e.g., via different respective nodes of a tree structure. Various other implementations and configurations of input objects can be employed, examples of which are discussed in the following scenarios.

Figure 4:
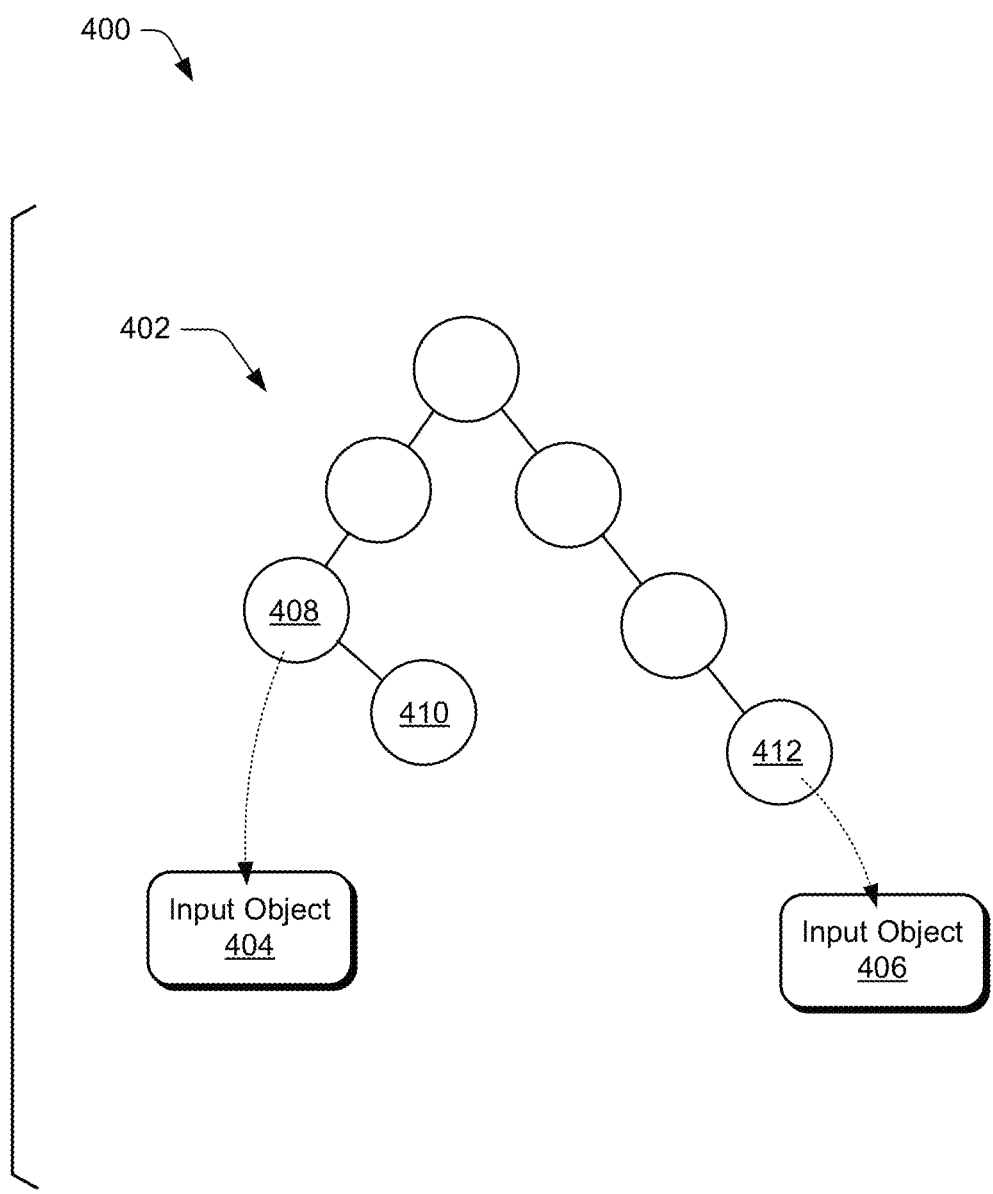
FIG. 4 illustrates an example implementation scenario in accordance with one or more embodiments.

FIG. 4 illustrates an example implementation scenario 400 in accordance with one or more embodiments. The scenario 400 includes a tree structure 402 which represents various visual elements. For example, individual nodes of the tree structure 402 represent different visual elements of a display, such as elements of a GUI.

The scenario 400 further includes an input object 404 and an input object 406. The input object 404 is linked to a node 408 of the tree structure 402 such that input to a visual element associated with the node 408 is routed via the input object 404. In at least some embodiments, input to a node 410 traverses up the tree structure 402 to the node 408, and is thus routed via the input object 404. According to one or more embodiments, input to the node 408 and/or the node 410 does not traverse further up the tree structure 402. Thus, in at least some embodiments, input to a node of a tree structure traverses up the tree until it reaches a node linked to an input object, at which point the input is routed via the input object and does not traverse further up the tree. Alternatively, input to a node can be routed via an input object and may continue traversing a tree, e.g., to a root node.

The input object 406 is linked to a node 412 of the tree structure 402 such that input to a visual element associated with the node 412 is routed via the input object 406.

According to various embodiments, the input object 404 and the input object 406 are each associated with a different graphics framework such that input to the respective node(s) is routed to a different respective framework. Alternatively or additionally, the input object 404 and the input object 406 can be associated with the same graphics framework such that input to the respective node(s) is routed via the respective input objects to the same graphics framework.

Figure 5:
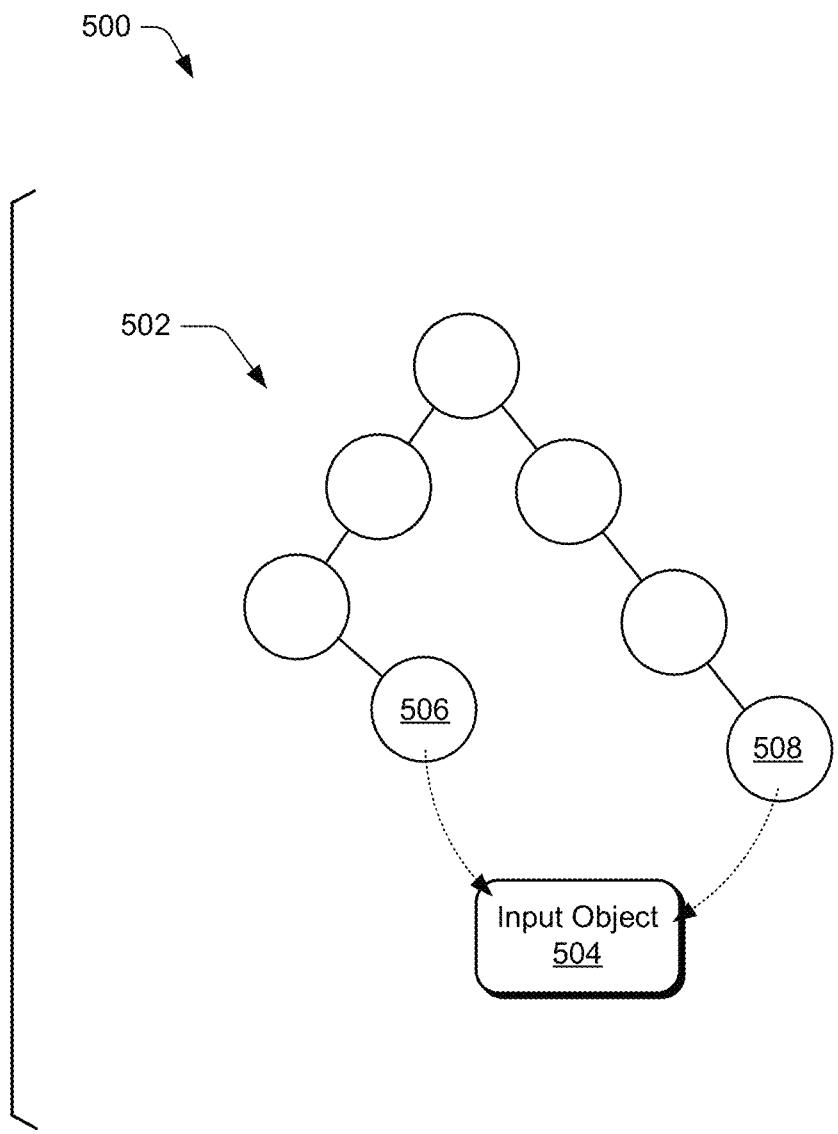
FIG. 5 illustrates an example implementation scenario in accordance with one or more embodiments.

FIG. 5 illustrates an example implementation scenario 500 in accordance with one or more embodiments. The scenario 500 includes a tree structure 502 which represents various visual elements. For example, individual nodes of the tree structure 502 represent different visual elements of a display, such as elements of a GUI.

The scenario 500 further includes an input object 504, which is linked to a node 506 and a node 508 of the tree structure 502. Thus, as illustrated, a single input object may be linked to multiple nodes such that the input object can route input from the different nodes to a particular graphics framework. The input object 504 may be associated with an instance of a graphics framework, and/or multiple graphics frameworks.

Figure 6:
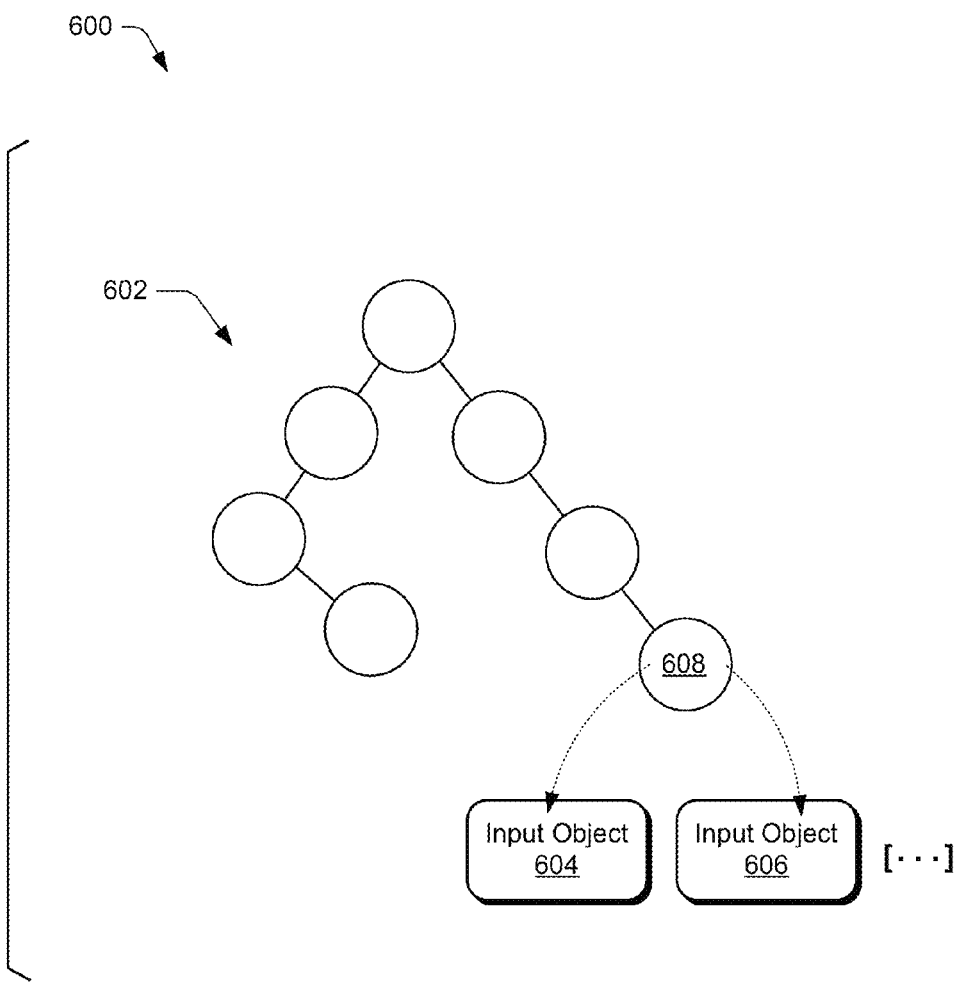
FIG. 6 illustrates an example implementation scenario in accordance with one or more embodiments.

FIG. 6 illustrates an example implementation scenario 600 in accordance with one or more embodiments. The scenario 600 includes a tree structure 602 which represents various visual elements. For example, individual nodes of the tree structure 602 represent different visual elements of a display, such as elements of a GUI.

The scenario 600 further includes an input object 604 and an input object 606, which are linked to a node 608 of the tree structure 602. Thus, input to a visual element of the node 608 can be routed via both the input object 604 and the input object 606. According to various embodiments, the input object 604 and the input object 606 can be associated with different graphics frameworks, and/or with the same graphics framework. Thus, input to a visual element of the node 608 can be routed via both the input object 604 and the input object 606 to respective graphics frameworks, and/or the same graphics framework.

In at least some embodiments, input objects can be used to process different types of input, such as keyboard input, mouse input, touch input, pen input, and so on. For instance, consider an implementation where the input object 604 is generated to route keyboard input, and the input object 606 is generated to route touch input, such as touch input to a touch screen and/or other touch-sensitive functionality.

In such a scenario, if keyboard input is provided to the node 608, the keyboard input can be routed via the input object 604 and not the input object 606. If touch input is provided to the node 608, the touch input can be routed via the input object 606 and not the input object 604. In at least some embodiments, if keyboard and touch input are provided concurrently to the node 608, the respective input objects can separately detect and route the respective input types. The input object 604 and the input object 606 can each be associated with a respective processing thread, and thus can enable different input types to be routed to and processed by different respective processing threads. Thus, different types of input to a specific visual element can be controlled and/or routed by respective input objects.

According to one or more embodiments, different input objects can be used to process the same type of input for different purposes. For example, consider an implementation where stylus input is received by the node 608. The input object 604 can route the stylus input to one thread, which can process the stylus input to draw graphics, e.g., text characters. Further, the input object 606 can route the stylus input to a different thread, which can process the stylus input for purposes of character recognition. Thus, a single type of input can be routed by different input objects for a variety of purposes.

According to various embodiments, input to overlapping visuals can be appropriately routed. For instance, consider the following implementation scenario.

Figure 7:
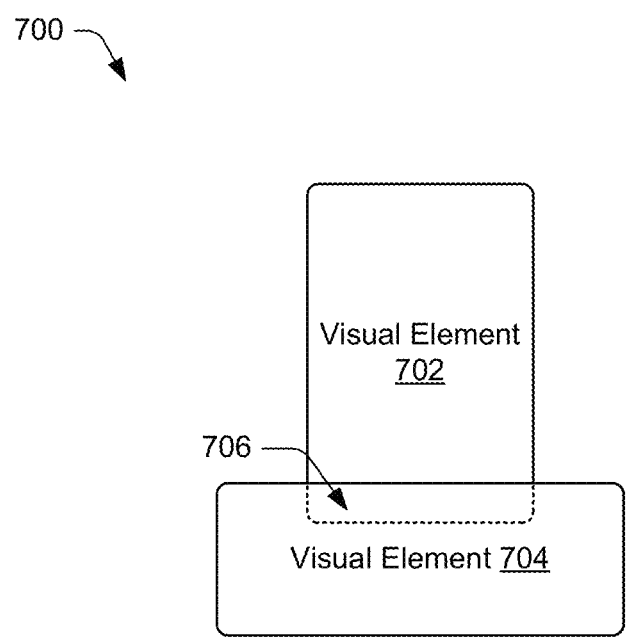
FIG. 7 illustrates an example implementation scenario in accordance with one or more embodiments.

FIG. 7 illustrates an example implementation scenario 700 in accordance with one or more embodiments. The scenario 700 includes a visual element 702 and a visual element 704. The visual elements 702, 704 can represent different visual elements of a display, such as elements of a GUI. According to various embodiments, the visual element 702 is managed by a different graphics framework than the visual element 704.

As illustrated, the visual element 704 partially overlaps the visual element 702 at an overlap region 706. If input is provided to the overlap region 706, a z-ordering of the visual elements can be considered in determining how the input is to be routed. For instance, each of the visual elements can be associated with a respective z-order that specifies a display order for the visual elements. The visual element 704, for example, can have a higher z-order than the visual element 702 such that the visual element 704 overlays the visual element 702 in a display area.

According to various embodiments, z-ordering can be used to control how input is routed. For instance, if input is provided to the overlap region 706, the input can be routed based on which visual has the highest z-order. For instance, since the visual element 704 has a higher z-order, input to the overlap region 706 can be routed based on an input protocol for the visual element 704. The input, for example, can be routed to a graphics framework, application, input object, and so on, linked to the visual element 704. Further, the input to the overlap region 706 may not be routed based on an input protocol associated with the visual element 702. Thus, routing of input to overlapping portions of visual elements can be prioritized based on z-order.

Having discussed some example implementation scenarios, consider now a discussion of some example procedures in accordance with one or more embodiments.

Example Procedures

The following discussion describes some example procedures for input object for routing input for visual elements in accordance with one or more embodiments. The example procedures may be employed in the environment 100 of FIG. 1, the system 1200 of FIG. 12, and/or any other suitable environment.

Figure 8:
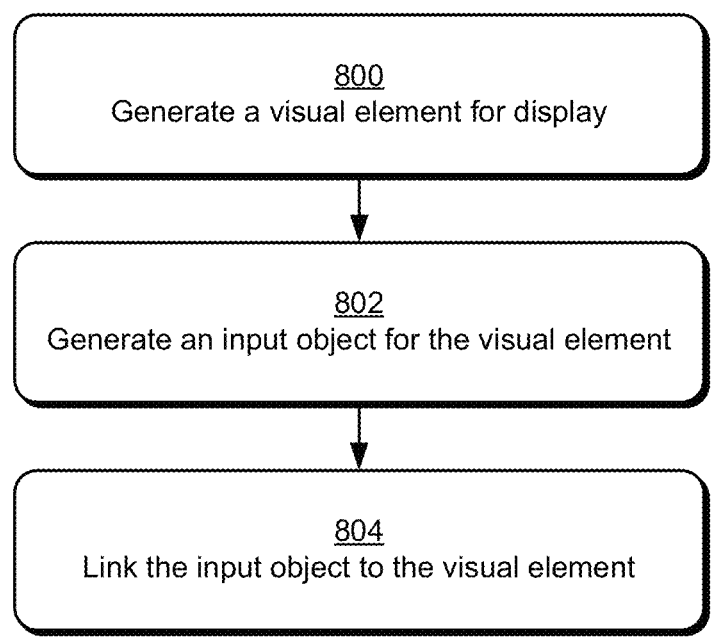
FIG. 8 is a flow diagram that describes steps in a method in accordance with one or more embodiments.

FIG. 8 is a flow diagram that describes steps in a method in accordance with one or more embodiments. Step 800 generates a visual element for display. The visual element, for instance, can be generated by an application, a graphics framework, and so forth. As detailed in the examples above, the visual element can be a sub-element of a display region, such as a sub-element of a larger GUI.

Step 802 generates an input object for the visual element. The input object, for example, can be generated by a functionality that generated the visual element, such as an application, a graphics framework, and so on. Alternatively or additionally, the input object can be generated by a different functionality, such as the graphics manager module 110.

Step 804 links the input object to the visual element. For instance, the input object can be bound to an identifier for the visual element. Alternatively or additionally, the input object can be bound to a display region in which the visual element is displayed, such as via associated with a particular pixel region. Thus, input to the visual element can be detected and routed via the input object.

As discussed above, linking an input object to a visual element enables input to the visual element to be routed to a functionality associated with the input object, such as a graphics framework, an application, a service, and so on. For instance, an application can utilize different graphics frameworks to render, process, and/or manage different visual elements of a GUI. Thus, the application can utilize input objects to enable input to the different visual elements to be routed to and/or handled by the appropriate graphics frameworks.

According to various embodiments, an input object enables input to a visual element associated with multiple applications to be handled appropriately. For instance, consider a scenario where an email application utilizes a separate document processing application to enable a user to view a document attached to an email. An input object linked to the document can enable input to the document to be routed to the document processing application, and not the email application. Further, the document processing application can be prevented from accessing email content other than the attached document. Thus, utilizing an input object enables input routing to be segregated between applications.

Figure 9:
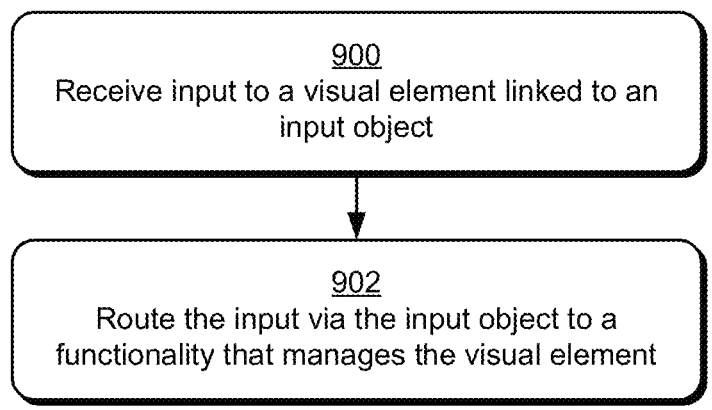
FIG. 9 is a flow diagram that describes steps in a method in accordance with one or more embodiments.

FIG. 9 is a flow diagram that describes steps in a method in accordance with one or more embodiments. Step 900 receives input to a visual element linked to an input object. The visual element, for example, can be a sub-element of a display region, such as a sub-element of a GUI.

Step 902 routes the input via the input object to a functionality that manages the visual element. The functionality, for example, can include an application, a graphics framework, and/or any other suitable resource. In a scenario where the visual element is a sub-element of a GUI, the input object can route the input to a functionality that manages the visual element and that is different than a functionality that manages a primary window of the GUI. Other input routing scenarios can be implemented, examples of which are discussed above.

According to one or more embodiments, a functionality that receives input can process the input to perform various tasks based on the input. Examples of such tasks include navigating between network resources (e.g., webpages), performing user-initiated actions, accessing content, and so forth.

In at least some embodiments, input to a visual element included as part of a simulated 3-dimensional (3D) environment can be routed via an input object linked to the visual element. For instance, as the visual element moves between regions and/or layers of the 3D environment, the input object remains linked to the visual element. Thus, wherever the visual element may be positioned in the 3D environment, input to the visual element can be detected and routed via the linked input object.

Figure 10:
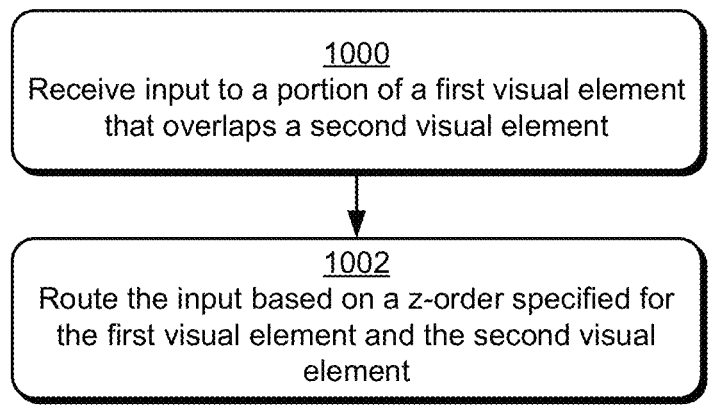
FIG. 10 is a flow diagram that describes steps in a method in accordance with one or more embodiments.

FIG. 10 is a flow diagram that describes steps in a method in accordance with one or more embodiments. Step 1000 receives input to a portion of a first visual element that overlaps a second visual element. For instance, input can be received to a region of a visual element that partially or totally overlaps another visual element in a display area.

Step 1002 routes the input based on a z-order specified for the first visual element and the second visual element. For instance, if the first visual element has a higher z-order than the second visual element, the input can be routed according to an input protocol for the first visual element. The input, for example, can be routed to a functionality that manages the first visual element, such as an application, a graphics framework, and so forth. In at least some embodiments, the input can be routed via an input object linked to the first visual element.

Conversely, if the second visual element has a higher specified z-order than the first visual element, the input can be routed based on an input protocol for the second visual element.

Figure 11:
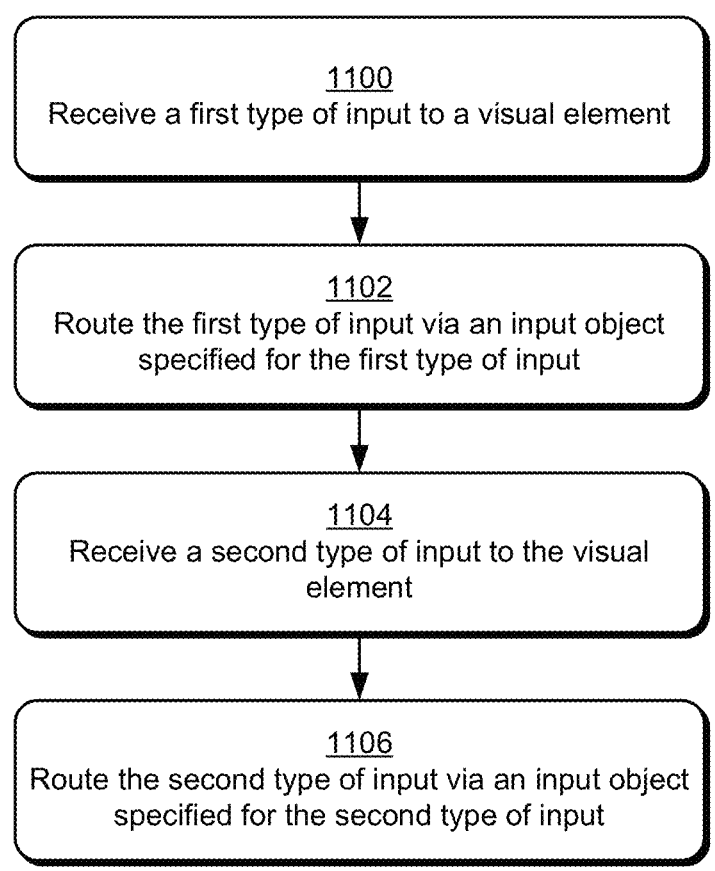
FIG. 11 is a flow diagram that describes steps in a method in accordance with one or more embodiments.

FIG. 11 is a flow diagram that describes steps in a method in accordance with one or more embodiments. Step 1100 receives a first type of input to a visual element. Various types of input can be received, such as keyboard input, mouse input, touch input, voice input, and so forth.

Step 1102 routes the first type of input via an input object specified for the first type of input. The first type of input, for instance, can be routed to a functionality configured to handle and/or process the first type of input.

Step 1104 receives a second type of input to the visual element. The second type of input, for example, is a different type of input than the first type of input.

Step 1106 routes the second type of input via an input object specified for the second type of input. The second type of input, for example, can be routed to a functionality configured to handle and/or process the second type of input. Thus, different input objects linked to a visual element can be utilized to route different types of input to the visual element. In at least some embodiments, this enables different types of input to be routed to different respective functionalities, such as different applications, graphics frameworks, and so forth. As referenced above, utilizing different input objects for different input types enables discrete processing threads to be generated for processing each input type.

Having discussed some example procedures, consider now a discussion of an example system and device in accordance with one or more embodiments.

Example System and Device

Figure 12:
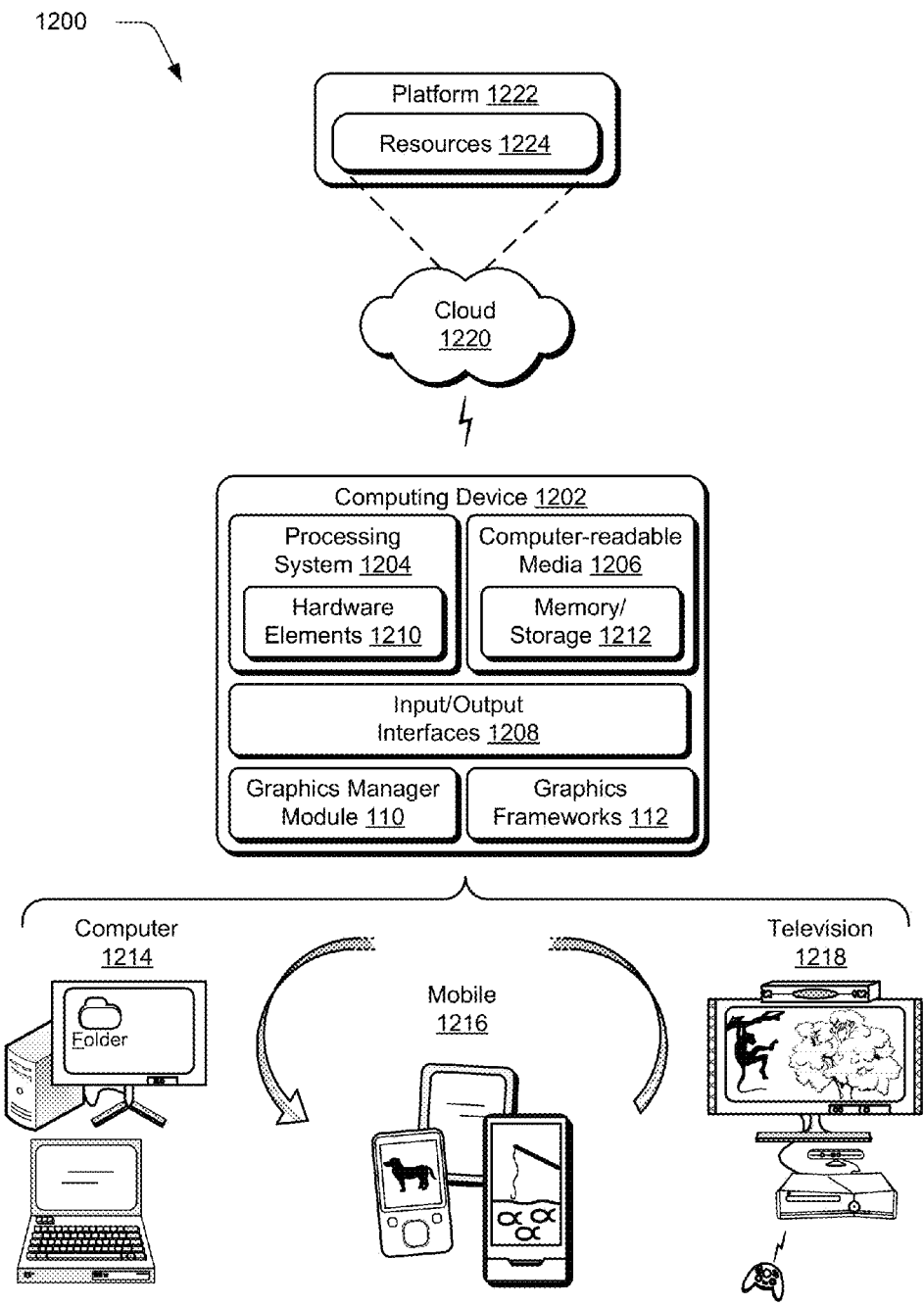
FIG. 12 illustrates an example system and computing device as described with reference to FIG. 1, which are configured to implement embodiments of techniques described herein.

FIG. 12 illustrates an example system generally at 1200 that includes an example computing device 1202 that is representative of one or more computing systems and/or devices that may implement various techniques described herein. For example, the computing device 102 discussed above with reference to FIG. 1 can be embodied as the computing device 1202. The computing device 1202 may be, for example, a server of a service provider, a device associated with the client (e.g., a client device), an on-chip system, and/or any other suitable computing device or computing system.

The example computing device 1202 as illustrated includes a processing system 1204, one or more computer-readable media 1206, and one or more Input/Output (I/O) Interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage 1212 may include volatile media (such as random access memory (RAM)) and/or nonvolatile media (such as read only memory (ROM), Flash memory, optical disks, magnetic disks, and so forth). The memory/storage 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1210 and computer-readable media 1206 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of modules that are executable by the computing device 1202 as software may be achieved at least partially in hardware, e.g., through use of computer-readable storage media and/or hardware elements 1210 of the processing system. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes. For instance, the computing device 1202 may be implemented as the computer 1214 class of a device that includes a personal computer, desktop computer, a multi-screen computer, laptop computer, netbook, and so on.

The computing device 1202 may also be implemented as the mobile 1216 class of device that includes mobile devices, such as a mobile phone, portable music player, portable gaming device, a tablet computer, a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein. For example, functionalities discussed with reference to the graphics manager module 110 and/or the graphics frameworks 112 may be implemented all or in part through use of a distributed system, such as over a "cloud" 1220 via a platform 1222 as described below.

The cloud 1220 includes and/or is representative of a platform 1222 for resources 1224. The platform 1222 abstracts underlying functionality of hardware (e.g., servers) and software resources of the cloud 1220. The resources 1224 may include applications and/or data that can be utilized while computer processing is executed on servers that are remote from the computing device 1202. Resources 1224 can also include services provided over the Internet and/or through a subscriber network, such as a cellular or Wi-Fi network.

The platform 1222 may abstract resources and functions to connect the computing device 1202 with other computing devices. The platform 1222 may also serve to abstract scaling of resources to provide a corresponding level of scale to encountered demand for the resources 1224 that are implemented via the platform 1222. Accordingly, in an interconnected device embodiment, implementation of functionality described herein may be distributed throughout the system 1200. For example, the functionality may be implemented in part on the computing device 1202 as well as via the platform 1222 that abstracts the functionality of the cloud 1220.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for input object for routing input for visual elements are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more computer-readable storage media including instructions stored thereon that, responsive to execution by the at least one processor, cause the system to implement functionalities including:
      a graphical user interface (GUI) including a primary window and a visual sub-element;
      graphics frameworks each configured to perform graphics operations for the system, the graphics frameworks including a first graphics framework that handles input to the primary window of the GUI, and a second graphics framework that handles input to the visual sub-element and does not handle input to the primary window; and
      an input object linked to the visual sub-element and configured to route input to the visual sub-element to the second graphics framework, the input object preventing input to the visual sub-element from being accessible to the first graphics framework.

2. A system as recited in claim 1, wherein the input object is configured such that input to the visual sub-element is routed to the second graphics framework and not the first graphics framework.

3. A system as recited in claim 1, wherein the input object is linked to at least one other visual sub-element of the GUI such that input to the other visual sub-element is routed to the second graphics framework.

4. A system as recited in claim 1, further comprising at least one other input object linked to the visual sub-element and configured to route input to the visual sub-element to at least one of the second graphics framework or a third graphics framework.

5. A system as recited in claim 1, further comprising at least one other input object linked to the visual sub-element, wherein the input object is configured to route a first type of input for the visual sub-element, and the other input object is configured to route a second type of input for the visual sub-element.

6. A system as recited in claim 1, wherein the GUI includes a different visual sub-element that at least partially overlaps the visual sub-element, and wherein input to an overlapping portion of the visual sub-element and the different visual sub-element is routed based on respective z-orders of the visual sub-element and the different visual sub-element in the GUI.

7. A system as recited in claim 1, wherein the GUI is generated for an application that is configured to utilize the first graphics framework and the second graphics framework to perform graphics operations.

8. A system as recited in claim 1, wherein the visual sub-element includes one or more respective sub-elements, and wherein input to the one or more respective sub-elements is routed via the input object to the second graphics framework.

9. A system as recited in claim 1, wherein the first graphics framework and the second graphics framework comprise different respective application programming interfaces (APIs).

10. A system as recited in claim 1, wherein the first graphics framework and the second graphics framework comprise different respective rendering engines.

11. One or more computer-readable storage media comprising instructions stored thereon that, responsive to execution by a computing device, cause the computing device to perform operations comprising:
   generating an input object for a visual element, the visual element being a sub-element of a display region input to which is handled by a first graphics framework;
   linking the input object to the visual element such that a first type of input to the visual element is routed to a second graphics framework that is different than the first graphics framework and is not routed to the first graphics framework;
   generating a different input object; and
   linking the different input object to the visual element such that a second type of input to the visual element is routed via the different input object to the first graphics framework.

12. One or more computer-readable storage media as recited in claim 11, wherein the display region comprises a primary window of a graphical user interface (GUI), and the visual element comprises a graphical element within the primary window.

13. One or more computer-readable storage media as recited in claim 12, wherein the GUI is generated for an application that is configured to utilize the first graphics framework and the second graphics framework to perform graphics operations.

14. One or more computer-readable storage media as recited in claim 11, wherein the input object is configured such that input to the visual element is not accessible to the first graphics framework.

15. One or more computer-readable storage media as recited in claim 11, wherein the display region includes a different visual element that at least partially overlaps the visual element, and wherein input to an overlapping portion of the visual element and the different visual element is routed based on respective z-orders of the visual element and the different visual element in the display region.

16. A computer-implemented method, comprising:
   generating an input object for a visual element that is a sub-element of a display region, input to the display region outside of the sub-element handled by a first functionality;
   linking the input object to the visual element;
   receiving input to the visual element; and
   routing the input via the input object to a second functionality that handles input to the visual element and that is different than the first functionality such that the input is prevented from being accessible to the first functionality.

17. A method as described in claim 16, wherein the display region comprises a primary window of a graphical user interface (GUI), and the visual element comprises a graphical element within the primary window.

18. A method as described in claim 16, further comprising:
   generating a different input object;
   linking the different input object to the visual element;
   routing a first type of input to the visual element via the input object; and
   routing a second type of input to the visual element via the different input object.

19. A method as described in claim 16, further comprising:
   generating a different input object;
   linking the different input object to the visual element;
   routing the input via the different input object for a different purpose than a purpose for which the input is routed via the input object.

20. A method as described in claim 16, wherein the display region includes a different visual element that at least partially overlaps the visual element, and the method further comprises:
    receiving input to an overlapping portion of the visual element and the different visual element;
    routing the input to the overlapping portion based on respective z-orders of the visual element and the different visual element in the display region.

\* \* \* \* \*